United States Patent
Lai

(10) Patent No.: US 9,488,220 B2
(45) Date of Patent: Nov. 8, 2016

(54) LINEAR GUIDEWAY AND CHANNEL MODULE THEREOF

(71) Applicant: OME TECHNOLOGY CO., LTD., New Taipei (TW)

(72) Inventor: Jia-Sin Lai, New Taipei (TW)

(73) Assignee: OME Technology Co., Ltd., New Taipei (TW)

( * ) Notice: Subject to any disclaimer, the term of this patent is extended or adjusted under 35 U.S.C. 154(b) by 0 days.

(21) Appl. No.: 14/632,211

(22) Filed: Feb. 26, 2015

(65) Prior Publication Data

US 2016/0178004 A1   Jun. 23, 2016

(30) Foreign Application Priority Data

Dec. 22, 2014   (TW) .............................. 103144767 A

(51) Int. Cl.
*F16C 29/06* (2006.01)
*F16C 29/00* (2006.01)

(52) U.S. Cl.
CPC ......... *F16C 29/0671* (2013.01); *F16C 29/005* (2013.01); *F16C 29/0611* (2013.01)

(58) Field of Classification Search
CPC .. F16C 29/005; F16C 29/06; F16C 29/0602; F16C 29/0609; F16C 29/0611; F16C 29/0633; F16C 29/0652; F16C 29/0654; F16C 29/0657; F16C 29/0669; F16C 29/0671; F16C 29/0673
See application file for complete search history.

(56) References Cited

U.S. PATENT DOCUMENTS

| | | | | |
|---|---|---|---|---|
| 6,558,039 B2* | 5/2003 | Wu | ...................... | F16C 29/0657 384/45 |
| 7,296,929 B2* | 11/2007 | Hantke | ............... | F16C 29/0609 384/44 |
| 7,862,236 B2* | 1/2011 | Chen | .................... | F16C 29/0602 384/43 |
| 8,220,997 B2* | 7/2012 | Chen | .................... | F16C 29/0609 384/45 |
| 8,282,283 B2* | 10/2012 | Pfister | ................. | F16C 29/0609 384/45 |
| 2013/0177267 A1* | 7/2013 | Tsao | .................... | F16C 29/0657 384/43 |

* cited by examiner

*Primary Examiner* — James Pilkington
(74) *Attorney, Agent, or Firm* — Rosenberg, Klein & Lee

(57) ABSTRACT

A channel module of a linear guideway includes a slider, two circulators, and two wire holders. The slider has two opposite inner loading surfaces. The circulators are respectively installed on two opposite sides of the slider and respectively connected to the inner loading surfaces. Each circulator includes an outer loading surface and two corner portions respectively extended from two opposite ends of the outer loading surface to two opposite ends of the corresponding inner loading surface. Each corner portion has a corner surface and a connecting surface. In each corner portion, an altitude difference is formed between an end of the corner surface connected to the connecting surface and the adjacent inner loading surface. The connecting surface is connected to the corresponding inner loading surface seamlessly for eliminating the altitude difference. The wire holders are respectively arranged adjacent to the inner loading surfaces.

9 Claims, 10 Drawing Sheets

LINEAR GUIDEWAY AND CHANNEL MODULE THEREOF

BACKGROUND OF THE INVENTION

1. Field of the Invention

The instant invention relates to a linear guideway; in particular, to a miniature linear guideway and a channel module thereof.

2. Description of Related Art

The miniature linear guideway is defined by size, but the miniature linear guideway also includes the linear guideway having wire holders. Moreover, the spherical rollers in the miniature linear guideway are not fixed by any chains or belts. Specifically, the conventional miniature linear guideway defines a circulation channel via the slider, the circulators, and the wire holders, and each circulator is integrally formed and engaged to the slider by directly pressing the circulator onto the slider. Additionally, the circulator has two corner portions arranged at two opposite ends thereof, and an altitude difference exists between each corner portion and an adjacent portion of the slider. Therefore, when the spherical rollers roll in the circulation channel, the altitude difference prevents the spherical rollers from rolling smoothly.

To achieve the abovementioned improvement, the inventors strive via industrial experience and academic research to present the instant disclosure, which can provide additional improvement as mentioned above.

SUMMARY OF THE INVENTION

The instant disclosure provides a linear guideway and a channel module thereof for solving the problem generated from the altitude difference of the conventional miniature linear guideway.

The instant disclosure provides a linear guideway, comprising: an elongated rail defined along a longitudinal direction; a slider having a groove, wherein the slider is movably disposed on the rail via the groove, and the groove has two inner loading surfaces facing each other and parallel to the longitudinal direction; two circulators respectively arranged at two outer sides of the groove; wherein the circulators are respectively connected to the inner loading surfaces of the groove, and each circulator comprises: an outer loading surface surroundingly defining an external channel, wherein the outer loading surfaces of the two circulators are respectively arranged at two outer sides of the inner loading surfaces; and two corner portions each having a corner surface and a connecting surface, wherein in each circulator, the corner portions are respectively extended from two opposite ends of the outer loading surface toward two opposite ends of the corresponding inner loading surface, the corner surface and the connecting surface of each corner portion are sequentially arranged from the corresponding end of the outer loading surface toward the corresponding end of the inner loading surface, wherein in each corner portion, an edge of the corner surface connected to the connecting surface and the corresponding end of the inner loading surface has an altitude difference arranged therebetween, and the connecting surface is seamlessly connected to the corresponding end of the inner loading surface; two wire holders respectively arranged adjacent to the two inner loading surfaces, wherein each wire holder and the corresponding inner loading surface cooperatively define an internal channel; two end caps respectively fixed on two opposite end surfaces of the slider and movably disposed on the rail, wherein each end cap has two retaining troughs recessed on a surface thereof adjacent to the slider, the corner portions of the circulators are respectively inserted into the retaining troughs of the end caps, such that each corner portion and the corresponding retaining trough cooperatively define a corner channel, wherein each internal channel, the two adjacent corner channels, and the adjacent external channel jointly define a circulation channel; and a plurality of rollers received in the circulation channels.

The instant disclosure also provides a channel module of a linear guideway, comprising: a slider having a groove, wherein the groove has two inner loading surfaces facing each other; two circulators respectively arranged at two outer sides of the groove; wherein the circulators are respectively connected to the inner loading surfaces of the groove, and each circulator comprises: an outer loading surface surroundingly defining an external channel, wherein the outer loading surfaces of the two circulators are respectively arranged at two outer sides of the inner loading surfaces; and two corner portions each having a corner surface and a connecting surface, wherein in each circulator, the corner portions are respectively extended from two opposite ends of the outer loading surface toward two opposite ends of the corresponding inner loading surface, the corner surface and the connecting surface of each corner portion are sequentially arranged from the corresponding end of the outer loading surface toward the corresponding end of the inner loading surface, wherein in each corner portion, an edge of the corner surface connected to the connecting surface and the corresponding end of the inner loading surface has an altitude difference arranged therebetween, and the connecting surface is seamlessly connected to the corresponding end of the inner loading surface; two wire holders respectively arranged adjacent to the two inner loading surfaces, wherein each wire holder and the corresponding inner loading surface cooperatively define an internal channel.

In summary, the linear guideway and the channel module thereof in the instant disclosure are provided with the connecting surfaces, in each circulator, the connecting surface is seamlessly connected to the corresponding end of the inner loading surface for eliminating the altitude difference, such that the spherical rollers can smoothly roll from the corner surface to the inner loading surface by the connecting surface.

In order to further appreciate the characteristics and technical contents of the instant invention, references are hereunder made to the detailed descriptions and appended drawings in connection with the instant invention. However, the appended drawings are merely shown for exemplary purposes, rather than being used to restrict the scope of the instant invention.

DETAILED DESCRIPTION OF THE PREFERRED EMBODIMENTS

Figure 1:
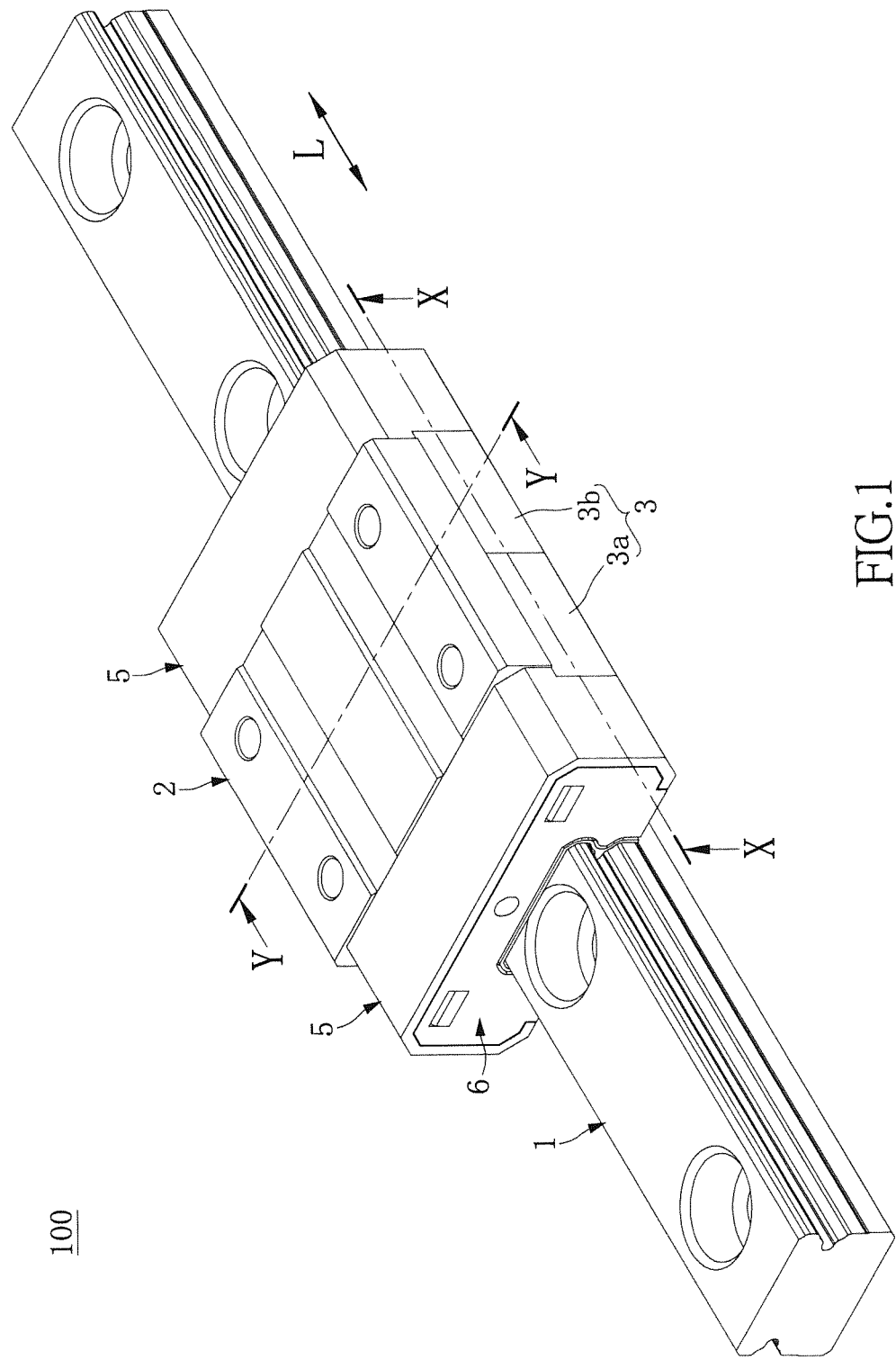
FIG. 1 is a perspective view showing a linear guideway according to the instant disclosure.
Figure 2:
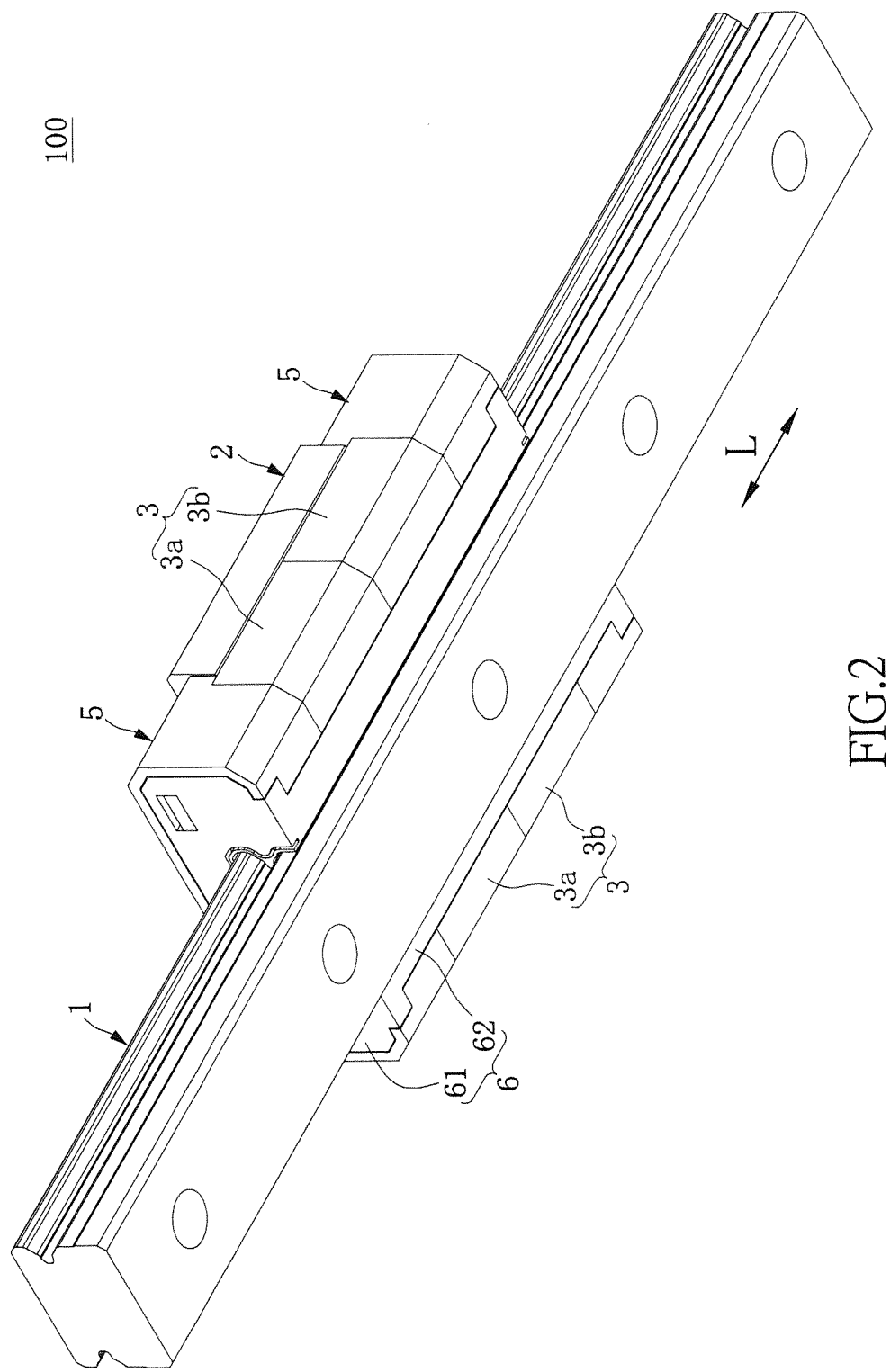
FIG. 2 is a perspective view showing the linear guideway from another observing angle.

Please refer to FIGS. 1 through 9, which show an embodiment of the instant disclosure. References are hereunder made to the detailed descriptions and appended drawings in connection with the instant invention. However, the appended drawings are merely shown for exemplary purposes, rather than being used to restrict the scope of the instant invention.

Please refer to FIGS. 1 through 4, which show a linear guideway 100 of the instant embodiment, and the linear guideway 100 can be a miniature linear guideway 100, but is not limited thereto. The linear guideway 100 includes an elongated rail 1, a slider 2, two circulators 3, two wire holders 4, two end caps 5, a dust-proof component 6, and a plurality of rollers 7. The rail 1 defines a longitudinal direction L. The circulators 3 and the end caps 5 are installed on the slider 2, and the wire holders 4 are installed on the end caps 5, thereby the above elements define two circulation channels C. The rollers 7 in the instant embodiment are spherical rollers 7 and are received in the circulation channels C. The slider 2 and the elements installed on the slider 2 are slidably disposed on the rail 1 along the longitudinal direction L. The following description discloses the construction of each element of the linear guideway 100, and then discloses the relationship of the elements.

Figure 4:
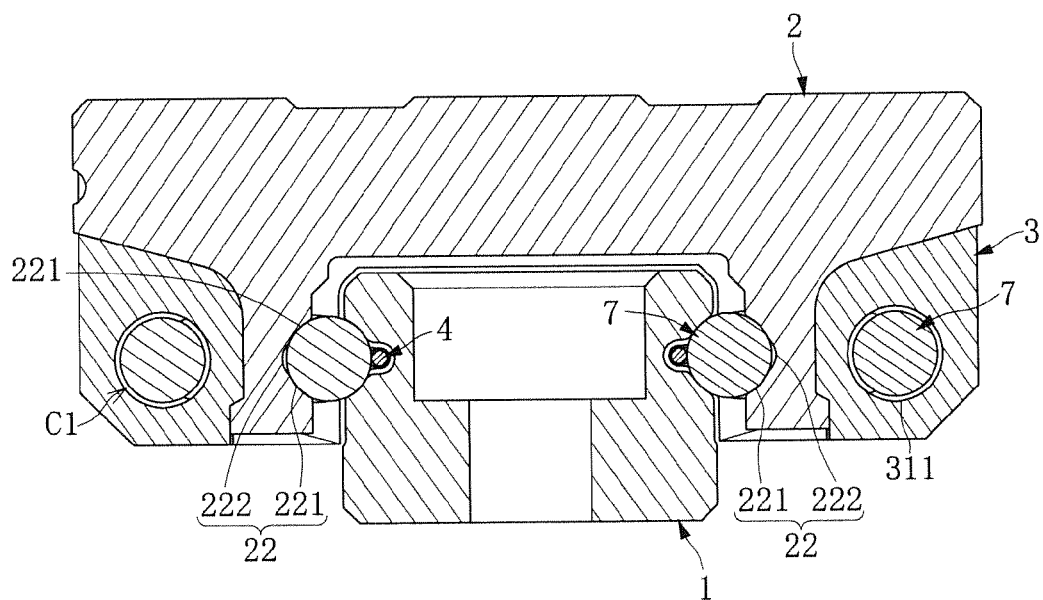
FIG. 4 is a cross-sectional view of the linear guideway as shown in FIG. 1 along the cross-sectional line Y-Y.
Figure 5:
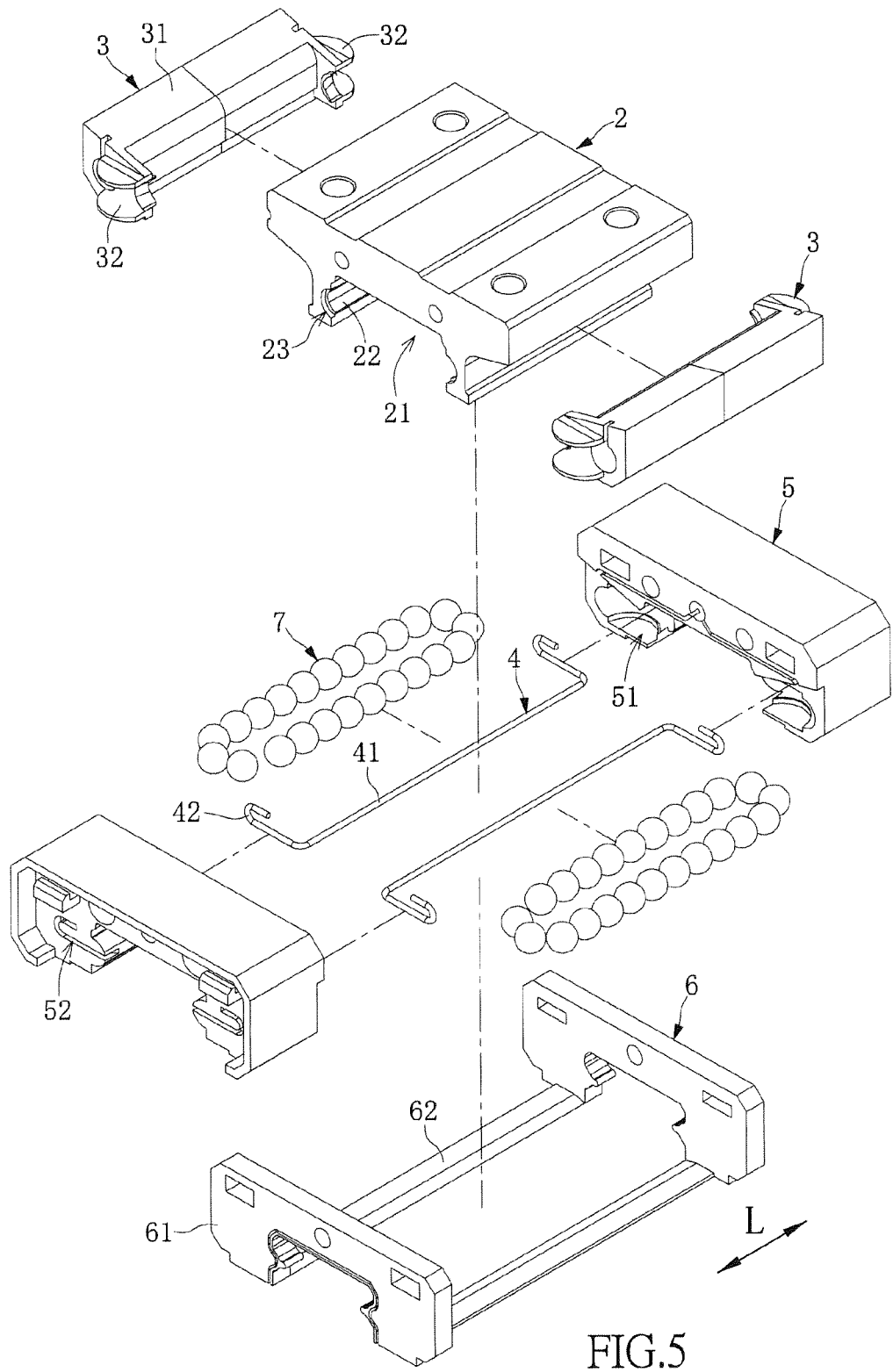
FIG. 5 is an exploded view of FIG. 1 without the rail.
Figure 8:
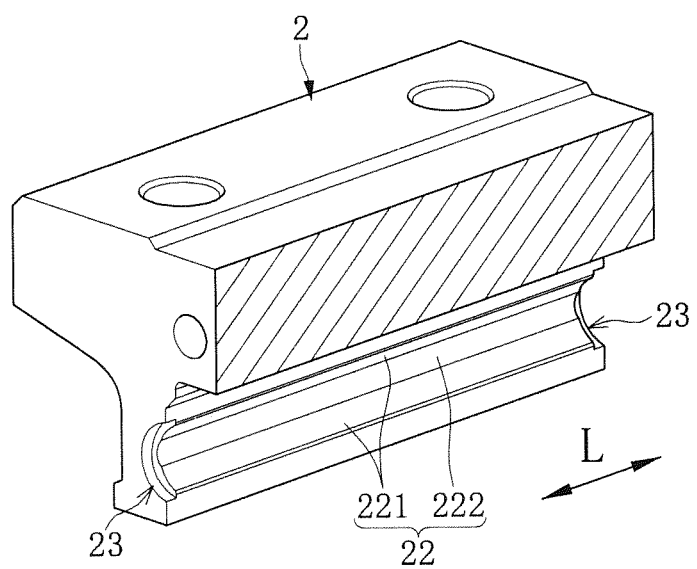
FIG. 8 is a cross-sectional view showing the slider as shown in FIG. 7.

Please refer to FIG. 5, the slider 2 has an elongated groove 21 parallel to the longitudinal direction L, and a cross-section of the slider 2 perpendicular to the longitudinal direction L and the slide 2 has a symmetrical π-shape (as shown in FIG. 4). The rail 1 is inserted into the groove 21, and the slider 2 is movable with respect to the rail 1. The groove 21 has two inner loading surfaces 22 facing each other and parallel to the longitudinal direction L. Specifically, the slider 2 has four notches 23 respectively recessed on the four ends of the inner loading surfaces 22 (i.e., FIG. 8 shows two of the notches 23 respectively recessed on two opposite ends of one inner loading surface 22).

Moreover, as shown in FIG. 4, each inner loading surface 22 has two arc-shaped first segments 221 and an arc-shaped second segment 222 arranged between the two first segments 221. A radius of each first segment 221 is substantially identical to a radius of each spherical roller 7 and is greater than a radius of each second segment 222. Thus, each spherical roller 7 can contact the first segments 221 of the corresponding inner loading surface 22, and each spherical roller 7 cannot contact the second segments 222 of the corresponding inner loading surface 22.

As shown in FIG. 5, the two circulators 3 are installed on the slider 2 and are respectively arranged at two opposite outer sides of the groove 21 (i.e., the left and right sides of the groove 21 as shown in FIG. 5). The circulators 3 are respectively connected to the inner loading surfaces 22 of the groove 21, that is to say, each circulator 3 corresponds to one of the inner loading surfaces 22. Specifically, the circulators 3 in the instant embodiment are the same, thus the following description only discloses one circulator 3 and the corresponding inner loading surface 22.

Figure 6:
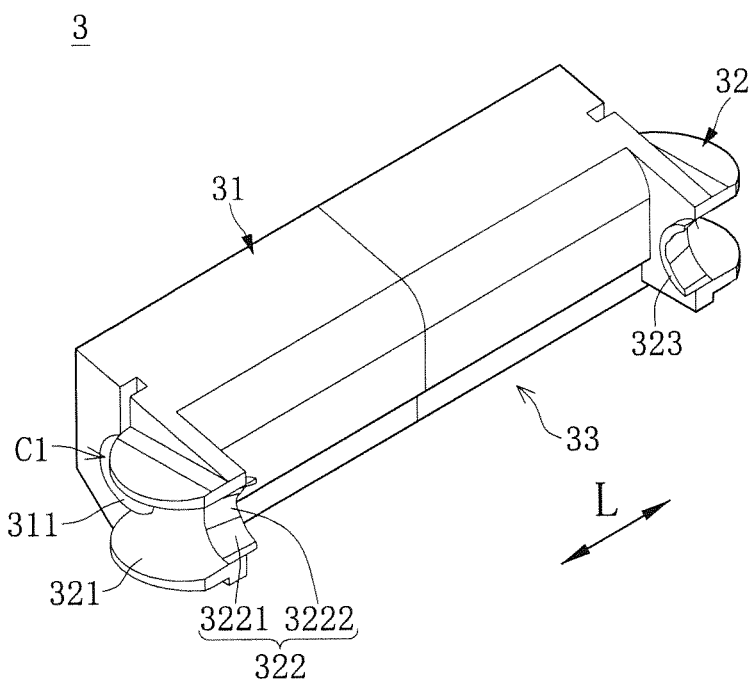
FIG. 6 is a perspective view showing the circulator of the linear guideway.

As shown in FIG. 6, the circulator 3 includes an elongated main portion 31 and two corner portions 32 respectively extended from two opposite ends of the main portion 31. The main portion 31 has an external channel C1. In other words, as shown in FIG. 4, the main portion 31 has an outer loading surface 311 surroundingly defining the external channel C1, and the outer loading surface 311 is arranged at the outer side of the corresponding inner loading surface 22.

Figure 7:
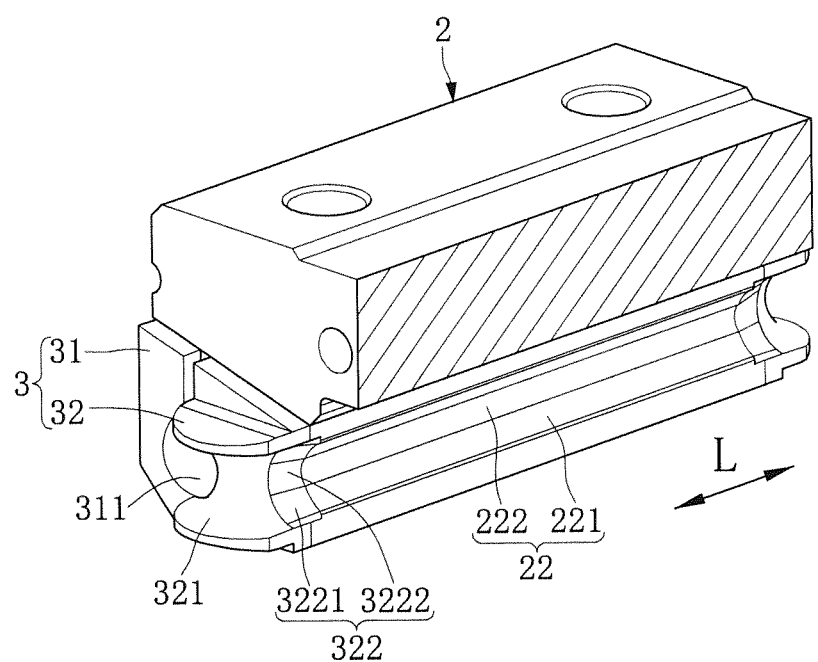
FIG. 7 is a perspective view showing the circulator installed on the slider.

As shown in FIG. 7, the two corner portions 32 are respectively extended from two opposite ends of the outer loading surface 311 toward two opposite ends of the corresponding inner loading surface 22. The corner portions 32 are substantially arranged between two virtual surfaces, which are respectively defined by extending from the outer and inner loading surfaces 311, 22. Each corner portion 32 has a corner surface 321 and a connecting surface 322, and the corner surface 321 and the connecting surface 322 of each corner portion 32 are sequentially arranged from the corresponding end of the outer loading surface 311 toward the corresponding end of the inner loading surface 22.

Figure 3A:
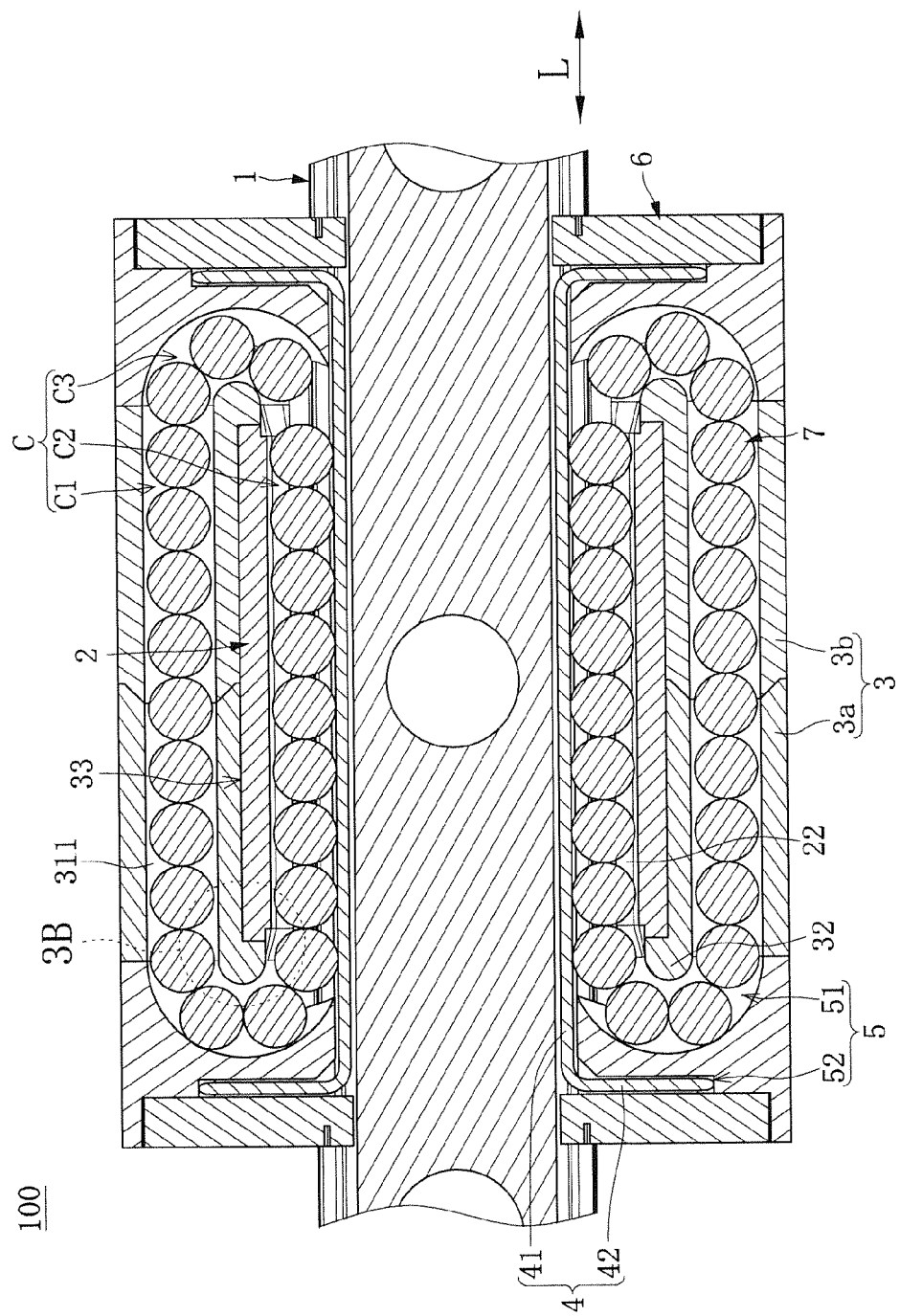
FIG. 3A is a cross-sectional view of the linear guideway as shown in FIG. 1 along the cross-sectional line X-X.
Figure 3B:
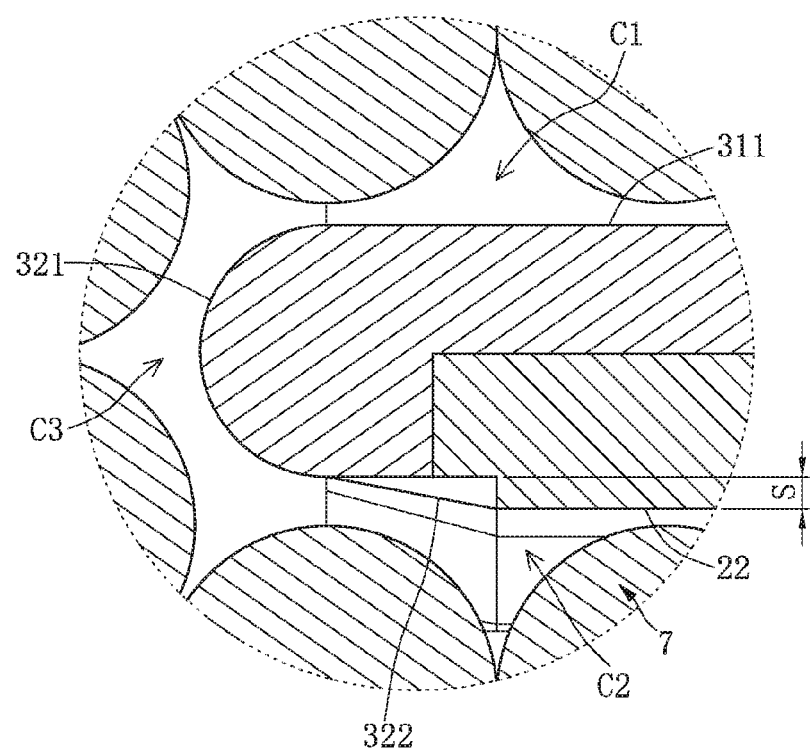
FIG. 3B is an enlarged view of the 3B portion as shown in FIG. 3A.

In each corner portion 32, a cross-section of the corner surface 321 is substantially a semi-circular, an altitude difference S exists between an edge of the corner surface 321 connected to the connecting surface 322 (i.e., the right edge of the corner surface 321 as shown in FIG. 3B) and the corresponding end of the inner loading surface 22. In each corner portion 32, the connecting surface 322 is arranged at the altitude difference S, that is to say, the connecting surface 322 is seamlessly connected to the corresponding end of the inner loading surface 22 for eliminating the altitude difference S, such that the spherical rollers 7 can smoothly roll from the corner surface 321 to the inner loading surface 22 by the connecting surface 322.

Moreover, each connecting surface 322 has two arc-shaped first connecting segments 3221 and an arc-shaped second connecting segment 3222 arranged between the two first connecting segments 3221, and a radius of each first connecting segment 3221 is greater than a radius of each second connecting segment 3222. The first connecting segments 3221 of each connecting surface 322 are respectively connected to the first segments 221 of the corresponding inner loading surface 22, and the second connecting segment 3222 of each connecting surface 322 is connected to the second segment 222 of the corresponding inner loading surface 22. Thus, each spherical roller 7 can contact the first connecting segments 3221 of the corresponding connecting surface 322, and each spherical roller 7 cannot contact the second connecting segment 3222 of the corresponding connecting surface 322.

Specifically, please refer to FIGS. 6 through 9; each circulator 3 of the instant embodiment includes two sub-segments 3a, 3b combined with each other. The connecting position of the sub-segments 3a, 3b is substantially located at the center of the main portion 31, that is to say, each circulator 3 is divided into the two sub-segments 3a, 3b at the center of the main portion 31, so that the corner portions 32 are respectively arranged on the sub-segments 3a, 3b in each circulator 3.

Figure 9:
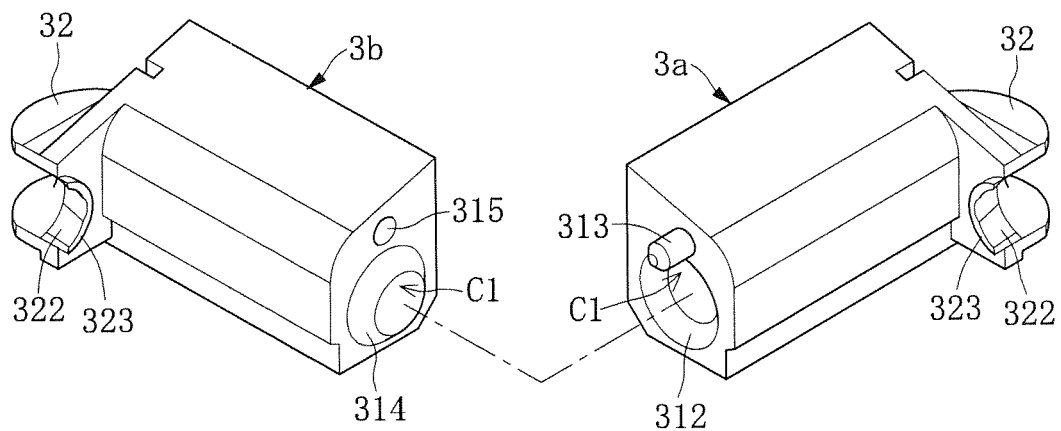
FIG. 9 is an exploded view of the circulator as shown in FIG. 6.

As shown in FIG. 9, in each circulator 3, the sub-segment 3a includes a positioning trough 312 and a foolproof pillar 313, another sub-segment 3b includes a positioning pillar 314 and a foolproof trough 315, and the positioning trough 312 and the foolproof pillar 313 are respectively configured to combine with the positioning pillar 314 and the foolproof trough 315. In each circulator 3, the positioning trough 312 and the positioning pillar 314 are arranged around the external channel C1, and the foolproof pillar 313 and the foolproof trough 315 are arranged on one side of the external channel C1.

Moreover, each sub-segment 3a or 3b has an engaging protrusion 323 arranged on the corner portion 32 thereof. The engaging protrusions 323 respectively conform to the notches 23, and each engaging protrusion 323 includes portions of the connecting surface 322. Specifically, in each circulator 3, the main portion 31 and the two corner portions 32 resemble an U-shape and cooperatively define an accommodating trough 33 (as shown in FIG. 6), and the engaging protrusions 323 is arranged in the accommodating trough 33.

Thus, as shown in FIGS. 7 through 9, in each circulator 3, the two sub-segments 3a, 3b are installed to the corresponding inner loading surface 22 of the slider 2 respectively in two opposite directions parallel to the longitudinal direction L, thereby a portion of the slider 2 including the corresponding inner loading surface 22 is received in the accommodating trough 33. Moreover, the positioning pillar 314 inserts into the positioning trough 312, the foolproof pillar 313 is inserted into the foolproof trough 315, and the engaging protrusions 323 are respectively inserted into the notches 23 for establishing a seamless connection between each connecting surface 322 and the corresponding end of the inner loading surface 22.

Each circulator 3 of the instant embodiment is installed on the slider 2 by engaging the two sub-segments 3a, 3b to the slider 2 along the longitudinal direction L, thereby prevent the conventional circulator from directly pressing onto the slider. Thus, the error generated from directly pressing the conventional circulator onto the slider can be avoided, thereby increasing the accuracy and the installing rate of the circulators 3 and slider 2.

As shown in FIGS. 3A through 5, each wire holder 4 includes a straight portion 41 and two J-shaped hooks 42 perpendicularly extended from two opposite ends of the straight portion 41, that is to say, each wire holder 4 includes two J-shaped hooks 42 respectively arranged on two opposite portions thereof. Specifically, the two wire holders 4 are respectively arranged adjacent to the two inner loading surfaces 22, and the straight portions 41 are substantially parallel to the longitudinal direction L. A projecting area of each straight portion 41 is defined by orthogonally projecting the straight portion 41 onto the adjacent inner loading surface that is located on the second segment 222 of the adjacent inner loading surface 22. Each hook 42 is arranged on a plane substantially perpendicular to the longitudinal direction L.

Thus, the straight portion 41 of each wire holder 4 and the corresponding inner loading surface 22 cooperatively define an internal channel C2. The spherical rollers 7 arranged in each internal channel C2 contact the corresponding wire holder 4 and the first segments 221 of the corresponding inner loading surface 22 for maintaining the stable movement of the spherical rollers 7.

It should be noted that the slider 2, the circulators 3, and the wire holders 4 of the instant embodiment can be jointly defined as a channel module of the linear guideway 100, and the channel module of the linear guideway 100 can be the channel module of the miniature linear guideway 100, but is not limited thereto.

The two end caps 5 are respectively fixed on two opposite end surfaces of the slider 2 (i.e., the left and right end surfaces of the slider 2 as shown in FIG. 3A) and are movably disposed on the rail 1. Each end cap 5 has two arc-shaped retaining troughs 51 recessed on a surface thereof adjacent to the corresponding end surface of the slider 2 (i.e., the right surface of the left end cap 5 as shown in FIG. 3A). Each end cap 5 has two hook troughs 52 recessed on a surface thereof away from the slider 2 (i.e., the left surface of the left end cap 5 as shown in FIG. 3A), and the hook troughs 52 respectively conform to the hooks 42.

Specifically, when the two end caps 5 are respectively fixed on the opposite end surfaces of the slider 2, the corner portions 32 of the circulators 3 are respectively inserted into the retaining troughs 51 of the end caps 5, such that each corner portion 32 and the corresponding retaining trough 31 cooperatively define a corner channel C3. Each internal channel C2, the two adjacent corner channels C3, and the adjacent external channel C1 jointly define one circulation channel C. Moreover, the hooks 42 are respectively engaged in the hook troughs 52 to prevent the wire holders 4 to separate from the end caps 5 and to maintain the relative position of the wire holders 4 and the slider 2.

The dust-proof component 6 is integrally formed and includes two U-shaped end dust-proof sheets 61 and two elongated bottom dust-proof sheets 62 connecting the end dust-proof sheets 61. The two end dust-proof sheets 61 are respectively fixed on the surfaces of the end caps 5 away from the slider 2 (i.e., the surface of each end cap 5 having the hook trough 52), and the inner edge of each end dust-proof sheet 61 contacts the surface of the rail 1. The hook troughs 52 are covered by the end dust-proof sheets 61 of the dust-proof component 6, thereby the hooks 42 are positioned between the end caps 5 and the end dust-proof sheets 61. The bottom dust-proof sheets 62 are substantially parallel to the longitudinal direction L, and the edges of the bottom dust-proof sheets 62 facing each other respectively contact two opposite side surfaces of the rail 1.

In summary, the linear guideway or the channel module in the instant embodiment is provided with the connecting surfaces, in each circulator, the connecting surface is seamlessly connected to the corresponding end of the inner loading surface for eliminating the altitude difference, such that the spherical rollers can smoothly roll from the corner surface to the inner loading surface via the connecting surface.

Moreover, each circulator of the instant embodiment is installed on the slider by engaging the two sub-segments to the slider along the longitudinal direction, thereby preventing the conventional circulator from directly pressing onto the slider. Thus, the error generated from the directly pressing the conventional circulator onto the slider can be avoided, thereby increasing the accuracy and the installing rate of the circulators and slider.

Additionally, the J-shaped hooks are respectively engaged in the J-shaped hook troughs to prevent the wire holders to separate from the end caps and maintain the relative position of the wire holders and the slider.

The descriptions illustrated supra set forth simply the preferred embodiments of the instant invention; however, the characteristics of the instant invention are by no means restricted thereto. All changes, alternations, or modifications conveniently considered by those skilled in the art are deemed to be encompassed within the scope of the instant invention delineated by the following claims.

What is claimed is:
1. A linear guideway, comprising:
   an elongated rail defined along a longitudinal direction;
   a slider having a groove, wherein the slider is movably disposed on the rail via the groove, and the groove has two inner loading surfaces facing each other and parallel to the longitudinal direction;

two circulators respectively arranged at two outer sides of the groove; wherein the circulators are respectively connected to the inner loading surfaces of the groove, and each circulator comprises:
an outer loading surface defining an external channel and completely surrounding the external channel, wherein the outer loading surfaces of the two circulators are respectively arranged at two outer sides of the inner loading surfaces; and
two corner portions each having a corner surface and a connecting surface,
wherein in each circulator, the corner portions are respectively extended from two opposite ends of the outer loading surface toward two opposite ends of the corresponding inner loading surface, the corner surface and the connecting surface of each corner portion are sequentially arranged from the corresponding end of the outer loading surface toward the corresponding end of the inner loading surface,
wherein in each corner portion, an edge of the corner surface connected to the connecting surface and the corresponding end of the inner loading surface has an altitude difference arranged therebetween, and the connecting surface is seamlessly connected to the corresponding end of the inner loading surface;
two wire holders respectively arranged adjacent to the two inner loading surfaces, wherein each wire holder and the corresponding inner loading surface cooperatively define an internal channel;
two end caps respectively fixed on two opposite end surfaces of the slider and movably disposed on the rail, wherein each end cap has two retaining troughs recessed on a surface thereof adjacent to the slider, the corner portions of the circulators are respectively inserted into the retaining troughs of the end caps, such that each corner portion and the corresponding retaining trough cooperatively define a corner channel, wherein each internal channel, the two adjacent corner channels, and the adjacent external channel jointly define a circulation channel; and
a plurality of rollers received in the circulation channels, wherein each roller is a spherical roller, each inner loading surface has two arc-shaped first segments and an arc-shaped second segment arranged between the two first segments, a radius of each first segment is substantially identical to a radius of each spherical roller and is greater than a radius of each second segment; each connecting surface has two arc-shaped first connecting segments and an arc-shaped second connecting segment arranged between the two first connecting segments, a radius of each first connecting segment is greater than a radius of each second connecting segment; the first connecting segments of each connecting surface are respectively connected to the first segments of the corresponding inner loading surface, and the second connecting segment of each connecting surface is connected to the corresponding second segment of the inner loading surface.

2. The linear guideway as claimed in claim 1, wherein each circulator includes two sub-segments combined with each other; wherein in each circulator, the corner portions are respectively arranged on the sub-segments, and each sub-segment has one end connected to the inner loading surface of the slider and one end connected to an adjacent sub-segment.

3. The linear guideway as claimed in claim 2, wherein each inner loading surface has two ends, and each end of each inner loading surface includes a notch, each sub-segment has an engaging protrusion arranged on the corner portion thereof, wherein the four engaging protrusions of the four sub-segments of the two circulators are respectively inserted into the four notches of the two inner loading surfaces for establishing a seamless connection between each connecting surface and the corresponding end of the inner loading surface.

4. The linear guideway as claimed in claim 3, wherein in each circulator, one of the sub-segments includes a positioning trough and a foolproof pillar, and another sub-segment includes a positioning pillar and a foolproof trough, the positioning trough and the foolproof pillar are respectively combined with the positioning pillar and the foolproof trough, and the positioning trough and the positioning pillar are arranged around the external channel, the foolproof pillar and the foolproof trough are arranged on one side of the external channel.

5. The linear guideway as claimed in claim 1, wherein a cross-section of each corner surface is substantially a semi-circular; each wire holder is in the groove and opposed to the second segment of the adjacent inner loading surface; the spherical rollers are arranged in each internal channel by contact with the corresponding wire holder and the first segments of the corresponding inner loading surface.

6. The linear guideway as claimed in claim 1, wherein each wire holder includes two J-shaped hooks respectively arranged on two opposite portions thereof, each end cap has two hook troughs recessed on a surface thereof away from the slider, the hooks are respectively received in the hook troughs for positioning the wire holders.

7. The linear guideway as claimed in claim 6, further comprising a dust-proof component fixed on a surface of each end cap away from the slider, wherein the hook troughs are covered by the dust-proof component.

8. A channel module of a linear guideway, comprising:
a slider having a groove, wherein the groove has two inner loading surfaces facing each other;
two circulators respectively arranged at two outer sides of the groove; wherein the circulators are respectively connected to the inner loading surfaces of the groove, and each circulator comprises:
an outer loading surface defining an external channel and completely surrounding the external channel, wherein the outer loading surfaces of the two circulators are respectively arranged at two outer sides of the inner loading surfaces; and
two corner portions each having a corner surface and a connecting surface,
wherein in each circulator, the corner portions are respectively extended from two opposite ends of the outer loading surface toward two opposite ends of the corresponding inner loading surface, the corner surface and the connecting surface of each corner portion are sequentially arranged from the corresponding end of the outer loading surface toward the corresponding end of the inner loading surface,
wherein in each corner portion, an edge of the corner surface connected to the connecting surface and the corresponding end of the inner loading surface has an altitude difference arranged therebetween, and the connecting surface is seamlessly connected to the corresponding end of the inner loading surface;
two wire holders respectively arranged adjacent to the two inner loading surfaces, wherein each wire holder and the corresponding inner loading surface cooperatively define an internal channel, wherein each inner loading surface has two arc-shaped first segments and an arc-shaped second segment arranged between the two first segments, each first segment is configured for contacting at least one spherical roller, a radius of each first segment is greater than a radius of each second segment; each connecting surface has two arc-shaped first connecting segments and an arc-shaped second connecting segment arranged between the two first connecting segments, a radius of each first connecting segment is greater than a radius of each second connecting segment; the first connecting segments of each connecting surface are respectively connected to the first segments of the corresponding inner loading surface, and the second connecting segment of each connecting surface is connected to the corresponding second segment of the inner loading surface.

9. The channel module as claimed in claim 8, wherein each circulator includes two sub-segments combined with each other; wherein in each circulator, the corner portions are respectively arranged on the sub-segments, each inner loading surface has two ends, and each end of each inner loading surface includes a notch, each sub-segment has an engaging protrusion arranged on the corner portion thereof, wherein the two sub-segments of each circulator are installed to the corresponding inner loading surface of the slider respectively in two opposite directions, and the four engaging protrusions of the four sub-segments of the two circulators are respectively inserted into the four notches of the two inner loading surfaces for establishing a seamless connection between each connecting surface and the corresponding end of the inner loading surface.

\* \* \* \* \*